United States Patent [19]

Kasugai

[11] Patent Number: 4,929,263
[45] Date of Patent: May 29, 1990

[54] AIR CLEANER

[75] Inventor: Joji Kasugai, Ichinomiya, Japan

[73] Assignee: Toyoda Gosei Co., Ltd., Nishikasugai, Japan

[21] Appl. No.: 308,681

[22] Filed: Feb. 10, 1989

[30] Foreign Application Priority Data

Feb. 26, 1988 [JP] Japan ................................. 63-045311
May 27, 1988 [JP] Japan ................................. 63-131163

[51] Int. Cl.$^5$ ............................................. B01D 46/10
[52] U.S. Cl. ......................................... 55/502; 55/497; 123/198 E; 425/500; 425/113; 425/387.1; 264/514; 264/141
[58] Field of Search .................. 210/445, 453; 55/497, 55/499, 502, 514; 123/198 E; 425/500, 113, 387.1; 264/514, 141

[56] References Cited

U.S. PATENT DOCUMENTS 3,932,153  1/1976  Byrns ................................. 210/445
4,713,097 12/1987  Grawi et al. ..................... 123/198 E
4,734,113  3/1988  Takagi et al. ......................... 55/497

FOREIGN PATENT DOCUMENTS 61-898248  5/1986  Japan .

OTHER PUBLICATIONS

"Toyota Carina", 1985–1988, FIG. C2131.

Primary Examiner—Bernard Nozick
Attorney, Agent, or Firm—Cushman, Darby & Cushman

[57] ABSTRACT

An air cleaner has a filter, an annular filter holder formed on the peripheral edge of the filter, a flange portion of U-like cross-section to which the outer circumference of the filter holder is embedded, and a case provided with an air inlet port and an air outlet port. This case is molded in blow molding using a filter member constituted integrally by the filter and the filter holder as an insert. In this air cleaner, the constitution parts, become as little as possible.

6 Claims, 5 Drawing Sheets

AIR CLEANER

BACKGROUND OF THE INVENTION

Field of the Invention

The present invention relates to an air cleaner comprising a case, a filter and a filter holder, which is favorable as an air cleaner of an engine for a vehicle or an industrial machine.

FIG. 1 shows an air cleaner 1 in the prior art.

The air cleaner 1 is composed of a case 3, a filter 17 and a filter holder 19. The case 3 is divided into an upper case 5 and a lower case 7, and respective cases 5, 7 are provided with uneven portion so as to improve the shape holding property and hose mounting portions 9, 11 for connecting the air cleaner hose. The abutting surface of the cases 3, 5 is provided with flanges 13, 15 respectively. The filter 17 is made of filter cloth. The filter holder 19 is cylindrical, and holds the peripheral edge of the filter 17 by its inner surface. The filter holder 19 is provided with a flange 21.

The flange 21 of the filter holder 19 is grasped by respective flanges 13, 15 as shown in FIG. 2, so that the case 5, 7 and the filter holder 19 are connected. A gasket 23 is interposed in each flanges. Numeral 25 in the FIG. designates a latch.

SUMMARY OF THE INVENTION

An object of the invention is to provide an air cleaner wherein a filter holder and a case become main body of constitution, and other parts (gasket, latch) are omitted, thereby the constitution part number is reduced and the cost of product becomes low.

In order to attain this object, in an air cleaner of the invention, the outer circumference of the filter is held by an annular filter holder, and the filter holder is in contacted airtightly with the inner surface of a groove on the inner surface of the case molded integrally. The air cleaner in such constitution is obtained in that the annular filter holder which holds the outer circumference of the filter is used as an insert and the case is molded in blow molding integrally.

Another object of the invention is to raise the rigidity of the case.

In order to attain this object, in the invention, ribs are installed to a cylindrical wall odf the filter holder and connected to the inner surface of the case.

A further object of the invention is to supply compressed air securely to the whole surface of a parison which becomes the case in step of blow molding though filter holder is used as an insert.

In order to attain this object, in the invention, the whole space devided by the wall of the filter holder-the rib-the case communicates with the space on the inside of the filter holder.

Still another object of the invention is to raise the rigidity of the filter holder.

In order to attain this object, in the invention, ribs are installed on the wall of the filter holder (The upper edge of the ribs are separated from the inner surface of the case.)

Still further object of the invention is to provide the air cleaner of light weight.

In order to attain this object, in the invention, the rib formed on the wall of the filter holder has U-like cross-section.

DESCRIPTION OF THE PREFERRED EMBODIMENTS

The invention will be described further in detail by way of embodiments.

First Embodiment

Figure 1:
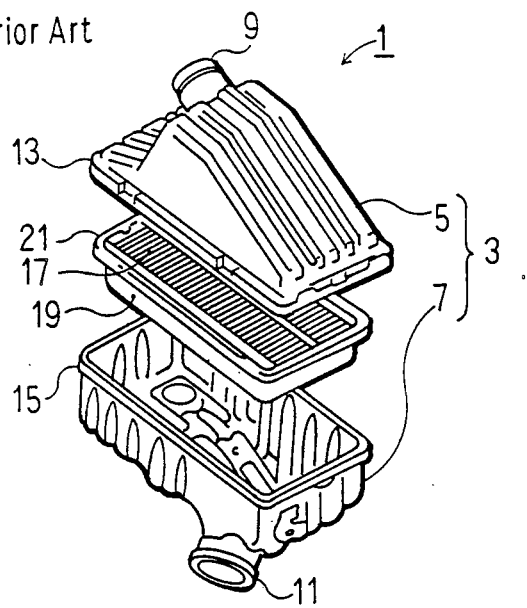
FIG. 1 is an exploded perspective view of an air cleaner 1 in the prior art.
Figure 2:
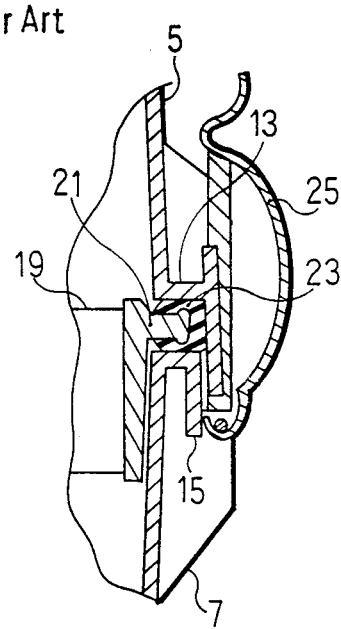
FIG. 2 Is a fragmentary enlarged sectional view illustrating mode of fixing of each of case 5, 7 and a filter holder 19.
Figure 3:
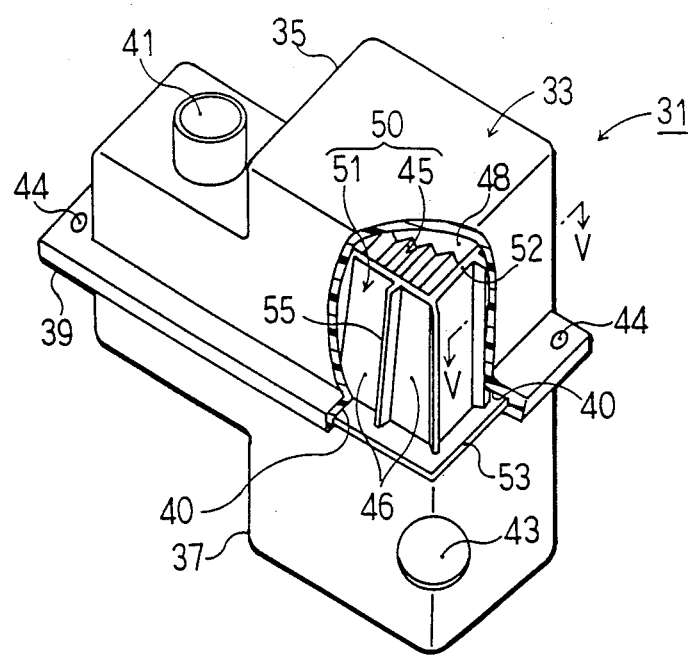
FIG. 3 is a perspective view partly in section of an air cleaner 31 in a first embodiment.

An air cleaner 31 of this embodiment is composed of a case 33, a filter 45 and a filter holder 51 as shown on FIG. 3.

The case 33 is a blow molding product being continuous and integral, and comprises an upper box member 35 of two-box type, a lower box member 37 having similar shape to this, and a flange portion 39. A groove 40 in the circumferential direction is formed in the inner surface of the flange portion 39 so as to divide the upper and lower box members 35, 37. The groove 40 corresponds to an annular rib 53 in the circumferential direction of a filter holder 51 as hereinafter described. Grooves 42 in the axial direction are formed in the inner surface of the case 33 (refer to FIG. 5). The grooves 42 in the axial direction correspond to ribs 55 in the axial direction of the filter holder 51.

An outlet port 41 of air is formed on the outer surface of the upper box member 35. An inlet port 43 is formed on the outer surface of the lower member 37. A through hole 44 is bored on the flange portion 39. A retainer (not shown) connected to the vechile body is fitted to the through hole 44 so as to fix the air cleaner.

Forming material of the case 33 is usual thermoplastic synthetic resin for blow molding of PP or the like. Also as clearly understood from FIG. 3, an even portion seen in the prior art does not exist on the surface of the case 33 of the embodiment. Therefore the air cleaner 31 of the embodiment is adapted for the vehicle design concept in recent years where the appearance within the bonnet also becomes a problem.

To the filter 45 is applied that made of filter cloth in similar manner to the prior art. The filter 45 is provided with folds from the viewpoint of increasing the surface area.

Material of the filter 45 may be made of filter paper.

Figure 4:
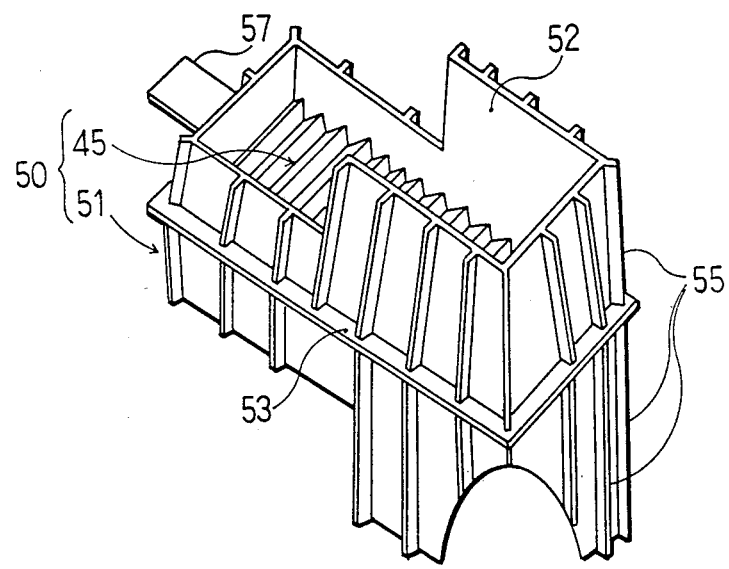
FIG. 4 is a perspective view of a filter member 50 comprising a filter 45 and a filter holder 51.

The filter holder 51 as shown in FIG. 4 is an annular member formed on the outer circumference of the filter 45, and composes of a cylindrical wall 52, the annular rib 53 in the circumferential direction and the ribs 55 in the axial direction.

The wall 52 is a cylindrical member formed on the outer circumference of the filter 45, and holds the filter 45 by embedding the peripheral edge of the filter 45 therein. The peripheral edge of the filter 45 attains to the annular rib 53. As modes of connection between the filter 45 and the filter holder 51, in addition to the above description, chemical method such as bonding or mechanical method such as screwfixing may be adopted.

The annular rib 53 is in contacted airtightly with the inner surface of the groove 40. Thereby it follows that the filter holder 51 is connected to the inner surface of the case 33.

Figure 5:
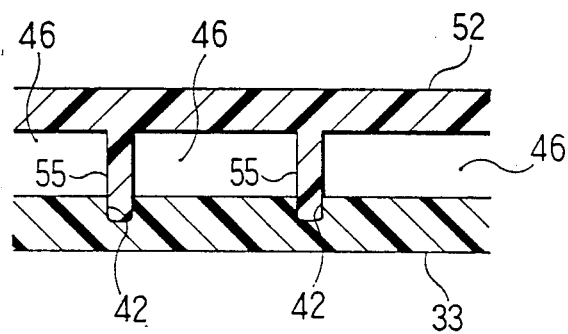
FIG. 5 is a fragmentary enlarged sectional view illustrating structure of a filter holder 51 and a case 33 connected by ribs 55 (a sectional view taken in line V—V in FIG. 3)

A plurality of ribs 55 formed from the annular rib 53 in the vertical direction exist, and as shown in FIG. 5 respective vertical ribs 55 are in contacted with the grooves 42 in the axial direction formed on the inner surface of the case 33. These vertical ribs 55 become a reinforcing member to secure the shape holding property of the air cleaner.

The vertical ribs 55 may be formed obliquely with respect to the axial line of the filter holder 51. Also a knob portion 57 is extended from the annular rib 53 and nearly flush with the annular rib 53.

Figure 6:
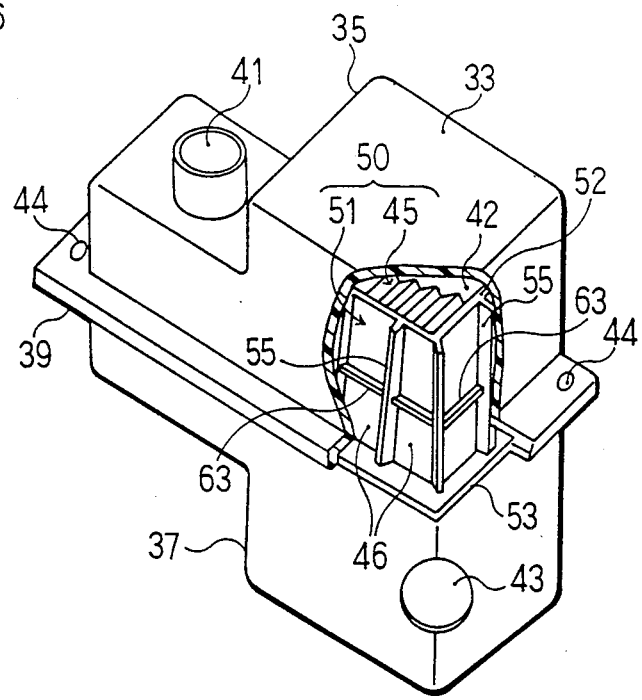
FIG. 6 is a perspective view illustrating a rib 63 in a modification.

In FIGS. 3 and 4, although one annular rib 53 is formed in the circumferential direction to the filter holder 51, a plurality of ribs in the circumferential direction may be formed in order to raise the rigidiety of the filter holder 51. In this case, as shown in FIG. 6. height of ribs 63 in the circumferential direction is made lower than the ribs 55 in the axial direction, and the upper edge of the ribs 63 is separated from the inner surface of the case 33.

This is effected so that compressed air prevails throughout the whole region of a parison 85 during the blow molding process as hereinafter described.

Figure 7:
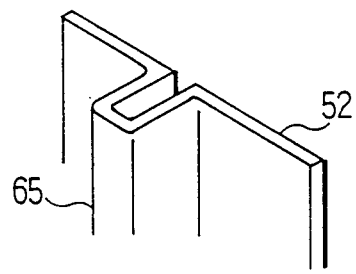
FIG. 7 is a perspective view illustrating a rib 65 in a modification.

As shown in FIG. 7, a rib 65 having U-like cross-section and both ends at the opening side connected to the wall 52 may be applied. In this case, since the rib is made thin, the air cleaner may be made lightweight.

Also the rib may be formed on the inner surface of the wall

Next, manufacturing method of the air cleaner 31 shown in FIG. 3 will be described.

The manufacturing method comprises following processes a~f.

(a) preparation step of the filter member 50.

The filter 45 is used as an insert, and the filter holder 51 is molded in injection molding by synthetic resin material (such as PP) thereby the filter member 50 is formed.

(b) step of supplying a parison made of thermoplastic resin to covering of the filter member 50.

Figure 8:
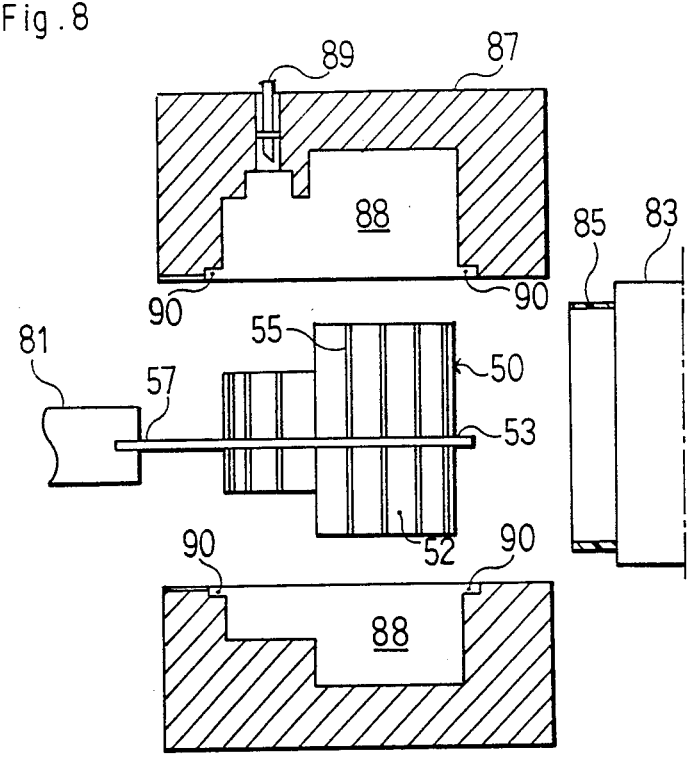
FIG. 8 is a sectional view illustrating process of coating a filter member 50 by a parison 85.
Figure 9:
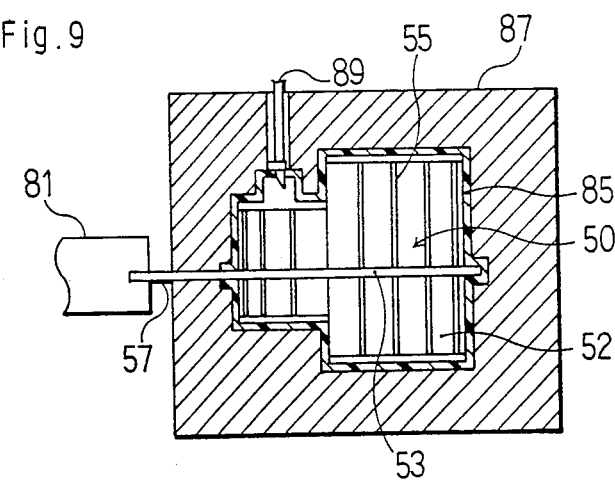
FIG. 9 is a sectional view illustrating blow molding.
Figure 10:
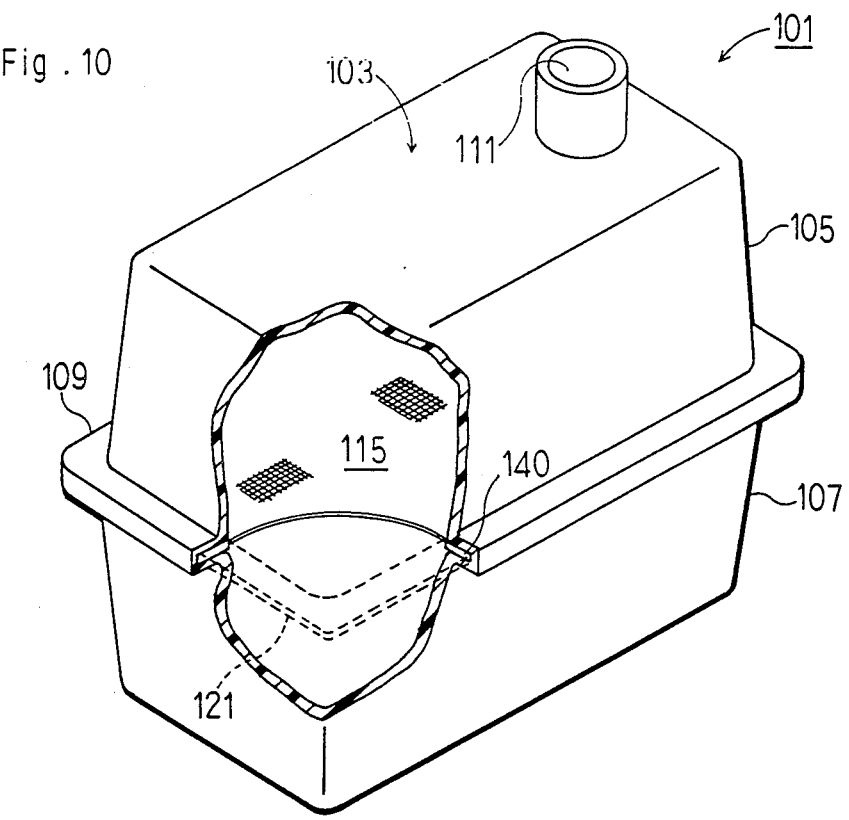
FIG. 10 is a perspective view partly in section of an air cleaner 101 in a second embodiement.

Next, as shown in FIG. 8, the knob portion 57 of the filter holder 51 is set to a support bar 81. The parison 85 is extruded from an extrusion die 83, and the filter holder 51 is covered by the parison 85.

(c) mold closing step

A mold 87 having a cavity 88 of prescribed shape is aligned with the filter member 50, and the mold closing is performed. On the peripheral edge of the dividing surface of the cavity 88 of the mold 87 is formed a portion 90 corresponding to the annular rib 53. During the mold closing, in accordance with the surface forming the portion 90, the parison 85 is compressed so as to wrap the annular rib 53. Thereby the flange portion 39 with U-like cross-section is formed. The inner surface of the flange portion 39 is the groove 40. It follows that the annular rib 53 is in contacted airtightly with the inner surface of the groove 40.

(d) blow-molding step

An air jet port 89 enclosed in the mold 87 is projected and struck in the parison 85, and the compressed air is blown into the parison 85. In the embodiment, although the air jet port 89 is stuck in a portion to be cut so as to form the air outlet port 41, the stuck portion is not limited to this portion to be cut. The air jet port 89 may be stuck in a portion to be cut so as to form the air inlet port 43. The parison 85 is pressed against the circumferential surface of the cavity 88 by the compressed air and therefore becomes the case 33 of prescribed shape. Spaces 46 is formed between the cylindrical wall 52 and the parison 85, since the vertical ribs 55 exist. This space 46 communicates with the inside space 48 of the filter holder 51 from the upper and lower sides shown in the FIG. of the filter holder 51 (refer to FIG. 5), so that the compressed air prevails throughout the whole surface of the parison 85 and the pressing of the parison against the cavity surface is affected uniformly.

The distance between the upper edge of the vertical ribs 55 and the cavity surface is made smaller than the thickness of the parison 85. Thereby the upper edge of the vertical ribs 55 in the axial direction bites into the inner surface of the parison 85. According to this biting, the grooves 42 in the axial direction are formed to the inner surface of the case 33, and the vertical ribs 55 are in contacted with the grooves 42 (refer to FIG. 5).

(e) mold removing step

The air jet port 89 stuck in the parison 85 (becoming the case 33) is enclosed in the mold 87, and the mold 87 is opened. The "blow molding product" is removed from the mold 87.

(f) cutting process

Since the above-mentioned "blow molding product" is a box body in tightly closed state, the air outlet port 41 and the air inlet port 43 are bored respectively on the upper box member 35 and the lower box member 37 divdived by the flange portion 39. The through hole 44 is bored on the flange portion 39. The knob portion 57 is also cut.

And then flash on surrounding of the cutting portion and the flange portion 39 is trimmed thereby the product is made.

Second Embodiemnt

An air cleaner 101 of this embodiment is composed of a case 103, a filter 115 and a filter holder 121.

The case 103 is a blow molding product being continuous and integral, and comprises an upper box member 105 of two-box type, a lower box member 107 having similar shape to this, and a flange portion 109. A groove 140 in the circumferential direction is formed in the inner surface of the flange portion 109 so as to divide the upper and lower box members 105, 107. The groove 140 corresponds to the outer circumference of the filter holder 121 as hereinafter described.

Numeral 111 in the FIG. designates an air outlet port. The lower box member 107 is provided with an air inlet port (not shown).

The filter 115 is formed by filter cloth of plate shape. Being different from that of the first embodiment, the filter 115 is not provided with folds.

Figure 11:
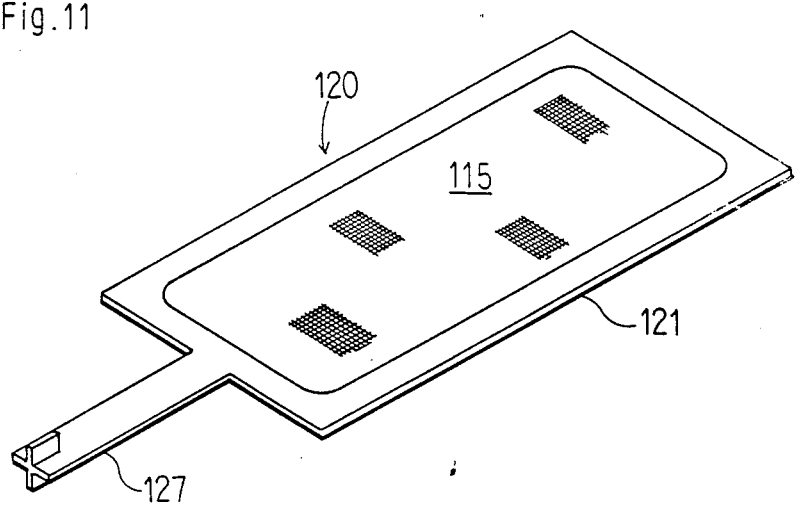
FIG. 11 is a perspective view of a filter member 120 comprising a filter 115 and a filter holder 121.

The filter holder 121 as shown in FIG. 11 is an annular member, and the perpherial edge of the filter 115 is embedded in the inner surface of the filter holder 121. The filter 115 and the filter holder 121 constitute a filter member 120. The filter member 120 shown in FIG. 11 is obtained in that the filter 115 is used as an insert and the filter holder 121 is molded in injection molding (molding material: PP or the like).

Numeral 127 in the FIG. designates a knob portion. The knob portion 127 is cut after the blow molding of case 103. The pheripheral edge portion (outer circumference) of the filter holder 121 is in contacted airtightly with the inner surface of the groove 140 of the case 103, thereby the filter holder 121 is fixed to the case 103. If the further high air tightness is required between the case 103 and the filter holder 102, it is preferable that iron wire is embedded in the outer circumference of the filter holder 121 (The iron wire is made an insert during the injection molding of the filter holder 121.) and the case 103 is molded in blow molding, and then the induction heating is performed thereby the inner surface of the case 103 and the outer circumference of the filter holder 121 are bonded in melting. In this case, molding material of the case 103 and the fiber holder 121 shall be the same or similar thermoplastic resin.

The air cleaner 101 in such constitution is obtained in sumilar manner to the first embodiment that the filter holder 121 is used as an insert and the case 103 is molded in blow molding.

The air cleaner 101 is of light weight in comparison to the air cleaner 31 of the first embodiment.

What is claimed is:

1. An air cleaner comprising:
    a case formed continuously and integrally by blow molding, said case having an air inlet port, an air outlet port, a flange portion which divides said air inlet port and said air outlet port on the outer surface of said case, and a groove formed in said flange portion and opening into the interior of said case;
    a filter arranged within said case; and
    a filter holder on the outer peripheral edge of said filter for holding the shape of the filter, said filter holder being substantially non-deformable in a thickness direction thereof, the outer periphery of siad filter holder being in direct, airtight contact with the inner surface of said groove, said filter holder comprising a perpherical wall, a peripheral rib formed on the other surface of said wall and in air tight contact with the inner surface of said groove, and a connecting rib which connects said peripheral wall and the inner surface of said case.

2. An air cleaner as defined in claim1, wherein a plurality of spaces are defined by the outer surface of the wall of said filter holder, the inner surface of said case, the side surface of said connecting rib and the side surface of said periperal rib, all said spaces communicating with a space defined by an inner surface of said filter holder.

3. An air cleaner as defined in claim 2, wherein said connecting rib is in contact with the groove formed on the inner surface of said case.

4. An air cleaner as defined in claim 2, wherein said connecting rib has U-like cross-section, and is connected to said wall at the opening side thereof.

5. An air cleaner as defined in claim 2, wherein said connecting rib comprises a plurality of vertical ribs extending from said peripheral rib in a nearly vertical direction.

6. An air cleaner as defined in claim 5, wherein on the outer surface of the wall of said filter holder, in addition to said peripheral rib, a plirality of ribs in the peripheral direction are formed, said ribs connecting each of said vertical ribs and the upper edge thereof being separated from the inner surface of said case.

* * * * *